United States Patent

Siegel

[15] 3,705,680

[45] Dec. 12, 1972

[54] TOOL HOLDER

[72] Inventor: William Jordan Siegel, 9337 Fraser Street, Silver Spring, Md. 20910

[22] Filed: June 8, 1970

[21] Appl. No.: 44,509

[52] U.S. Cl. ..................228/57, 15/114, 248/174
[51] Int. Cl. ..........................B23k 1/00, B23k 5/00
[58] Field of Search ........248/174, 176, 359; 228/51, 228/57, 20; 15/114, 209, 236

[56] References Cited

UNITED STATES PATENTS

| | | | |
|---|---|---|---|
| 2,570,041 | 10/1951 | Wedmore | 15/236 A |
| 2,308,098 | 1/1943 | Neal | 228/57 |
| 2,281,162 | 4/1942 | Kuehl | 15/236 A |
| 2,260,047 | 10/1941 | Nelson | 15/236 A |
| 2,213,367 | 9/1940 | Kuehl | 15/236 A |
| 3,609,791 | 10/1971 | Siegel et al. | 15/114 |
| 3,294,348 | 12/1966 | Cerisano | 248/176 X |
| 2,174,230 | 9/1939 | Shangle | 248/176 |

*Primary Examiner*—John F. Campbell
*Assistant Examiner*—R. J. Craig
*Attorney*—Fidelman, Wolffe and Leitner

[57] ABSTRACT

The disclosure relates to a tool holder bracket with a multi-apertured front panel portion. A tool holder cubby mounted in one of the apertures extends rearwardly of the front panel portion and a solder dump mounted in another aperture extends rearwardly of the front panel portion. The solder dump comprises a cylinder opened at both ends and a porous plug disposed inside the cylinder. Any air entrained solder blown down the solder dump will be caught by the porous plug. Desirably a horizontal base portion extends forward of the front panel so that it may serve as a support stand for a tool cleaning unit. The tool holder is particularly adapted for use with miniature soldering irons and a solder extractor.

5 Claims, 3 Drawing Figures

PATENTED DEC 12 1972 3,705,680
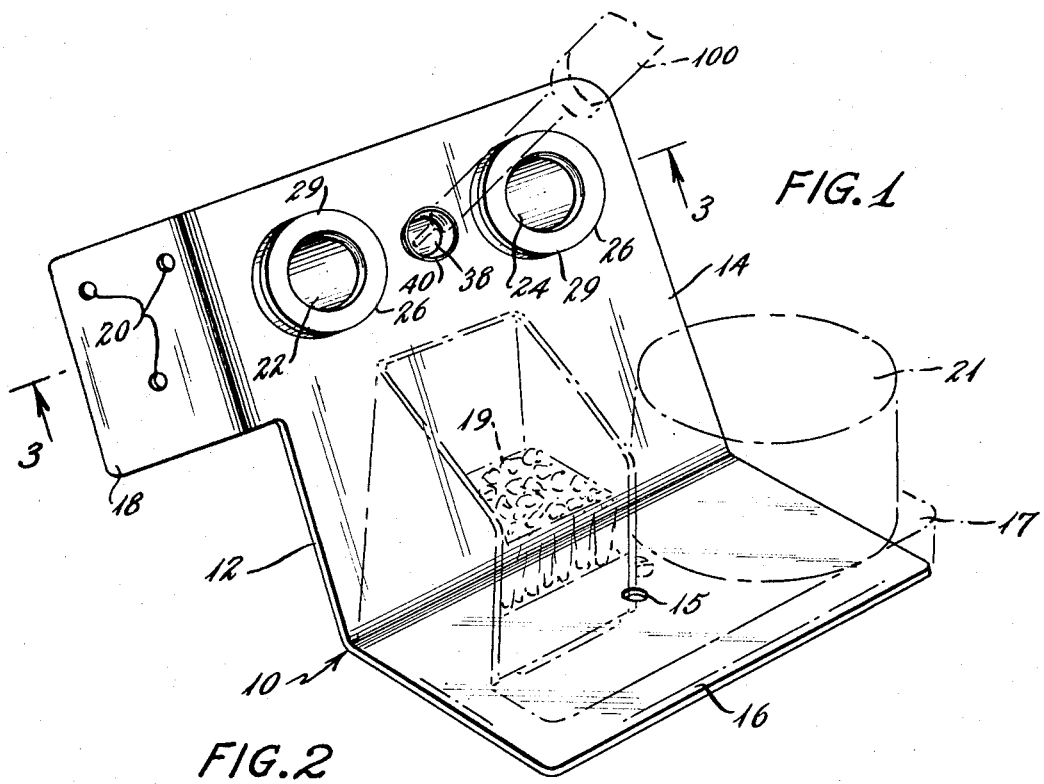
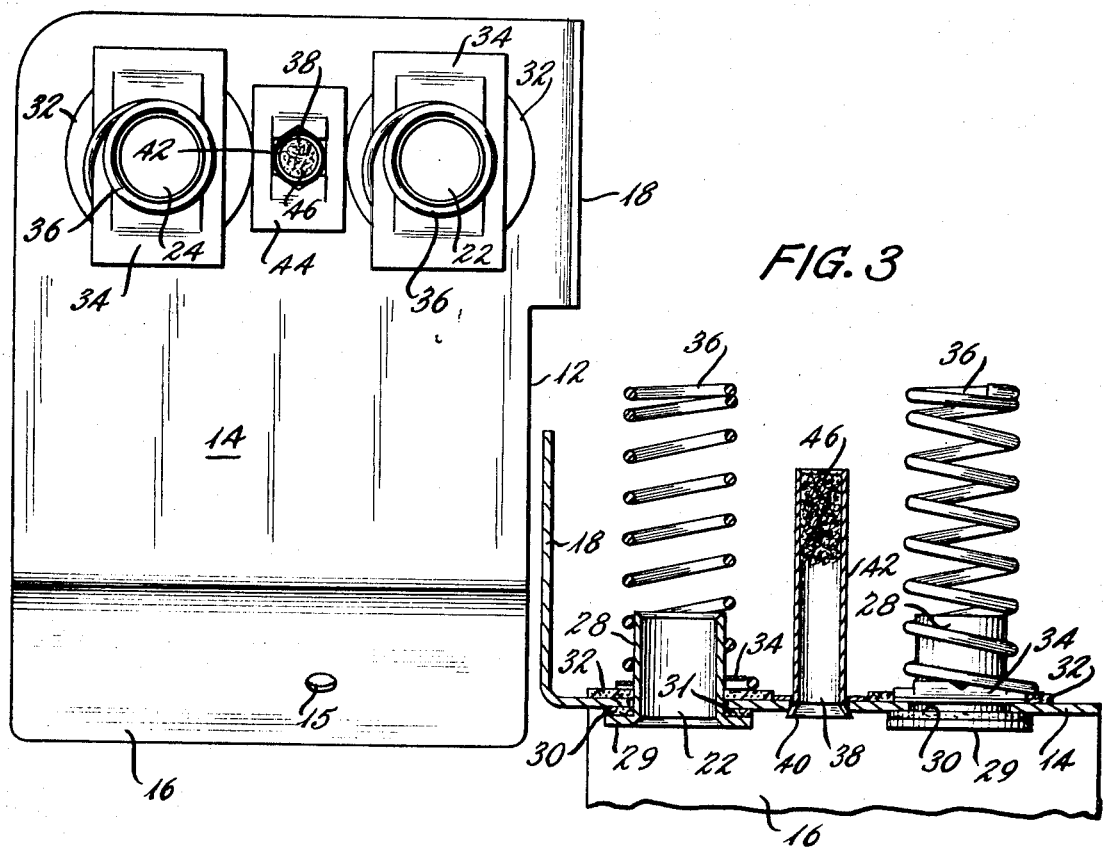

TOOL HOLDER

The present invention relates to a tool holder, and in particular, to a tool holder expressly adapted for use with small pencil grip tools, adapted for maintenance and repair of electronic equipment. More specifically, the present tool holder is expressly adapted for use with a pencil grip pneumatic solder extractor or remover such as is represented by design U.S. Pat. No. 214,865 and U.S. Pat. No. 3,392,897. At the same time the present tool holder is adapted to serve as the support for the Cleaning Unit and Stand disclosed in claims in Ser. No. 829,302 filed June 2, 1969 now U.S. Pat. No. 3,609,791. This cleaning unit is expressly intended for use with miniature soldering irons.

For further understanding of the present invention, reference is now made to the attached drawings wherein:

FIG. 1 is a diagrammatic representation showing of the tool holder of the present invention in its association with the Cleaning Unit and Stand;

FIG. 2 is a rear view of the tool holder; and

FIG. 3 is a sectional view taken along line 3—3 on FIG. 1.

Referring now to the drawings in FIG. 2, it may be seen that the present tool holder 10 comprises a bracket member 12 which includes a flat front or face panel 14 and a normally horizontal base 16 integral with the panel 14 but disposed at an obtuse angle thereto as is shown in the drawing. Since base 16 is intended to be mounted horizontally front panel 14 is inclined rearwardly. Also integral with front panel 14, but bent 90° therefrom to the rear thereof is at least one ear or side face 18. Ear 18 is provided with apertures 20 so that the entire tool holder may be secured e.g. bolted to a vertical wall surface. In the configuration shown in the drawing bracket 12 can be mounted only on the left side, alternatively or in addition (not shown) a side face may be provided on the right hand side of the bracket 12 for right side mounting, or the side face or faces may extend forward. In any event bracket 12 should be mounted so that base 16 is horizontal and as a result panel 14 is inclined rearwardly to facilitate resting tools in the tool holder wells on panel 14.

Allusion has already been made that the tool holder 10 of the present invention is adapted for use with the Cleaning Unit and Stand disclosed in Ser. No. 829,302, filed June 2, 1969. Such cleaning unit and stand 17 rests directly on bracket 12 as is shadow illustrated in FIG. 1 being for example bolted directly to base 16 at aperture 15 thereon. Briefly, the cleaning elements comprise a wire brush 19 and a cup 21 which contains a sponge. Aperture 15 may be used to secure bracket 12 to a support surface, and ear 18 omitted altogether.

Front panel face 14 contains several apertures therein in the upper regions including at least one relatively large aperture 22 and desirably, a second like aperture 24. Disposed in apertures 22 and 24 are identical tool holder wells or hot cubbies 26. Each well 26 comprises a short open cup or cylinder 28 with a flanged front face 29 larger than the aperture 22 or 24 so that it can bear against the material of panel 14 at the rim of aperture 22 or 24. Heat insulating washers 30 and 32, front and rear, are provided at cup 28, cup 28 is retained in its aperture by a spring lock washer 34 or equivalent retaining member, disposed on the rear side of face 14. A coil spring 36 forms a rear extension to cup 28 being secured to the rear of face 14 by lock washer 34 as is shown in FIGS. 2, and 3. Employment of open coil spring 36 as the base end of well 26 allows the tip end of a miniature soldering iron or solder extractor resting in well 26 to air cool readily and, by the same token, keeps the metallic cup 28 cool enough to touch, when the tool is hot, e.g. 1000° F and not switched off when placed in well 26.

An additional aperture 38 (usually smaller than aperture 22) is provided in face panel 14 between the tool holder wells 26. Mounted in aperture 38 is a molten solder dump 40 comprising a short, open at both ends, metallic cylinder 42, which cylinder also may be secured to front face 14 from the rear by a lock washer 44 or other retainer. The front edge of cylinder 40 may be upset so the cylinder does not fall through. At the base end of cylinder 42 is disposed a porous plug 46 of metal wire preferably steel wool, although any very air permeable barrier may be employed for porous plug 46. In contrast to the passive character of the tool holder wells 26 solder dump constitutes as an operating element just as the wire brush 19 and the sponge of the Cleaner Unit and Stand 17 are operating elements.

Experience with the solder extractor disclosed in design U.S. Pat. No. 214,865 and U.S. Pat. No. 3,392,897 has shown that a surface film and sometimes small molten globules of extracted solder remain inside the working tip of the extractor after use. Desirably the tool should be completely clean before being used again. The extractor operates to melt a solder joint and by suction removes the solder up the heated tip end of the extractor. If the solder extractor is switched from suction to pressure, e.g. connected to a source of compressed air, any molten droplets of solder can be blown out the tip end, thereby leaving the tool clean once again. (Parenthetically, it may be noted that the outside regions at the tip end of the solder extractor can be wire brushed on brush 19). Here the solder is blown out of the tip end of the solder extractor 100 into solder dump 40 and caught there by porous plug 46, after extended use plug 46 is removed and replaced. Presence of solder dump 40 has been found to be quite convenient even advantageous.

As a whole the tool holder of the present invention is a convenient to use adjunct to the solder extractor. It may be secured directly to the housing which contains the motor and pump which supplies suction (and pressure) to the extractor and it can carry a tool cleaning unit. All in all the tool holder adds a substantial measure of convenience to the repair work of a skilled electronic repair technician.

What is claimed is:

1. A tool holder comprising a bracket formed with a front panel portion, said front panel portion (having disposed therein at least one tool holder cubby and a solder dump) having at least two apertures therein, a tool holder cubby mounted in one aperture extending rearward of said front panel portion, and a solder dump mounted in another aperture extending rearward of said front panel portion, said solder dump comprising a cylinder open at both ends and a porous plug disposed inside the cylinder whereby air entrained solder will be caught by the porous plug and the air passed therethrough.

2. A tool holder, as in claim 1, wherein two tool holder cubbies are present in the front panel portion and the solder dump is disposed therebetween.

3. A tool holder, as in claim 1, wherein a base portion extends forward from the front panel portion at an obtuse angle thereto, said base portion being horizontal when the bracket is secured to a support means, said base portion further being adapted to serve as the support means element for a tool cleaning unit.

4. A tool holder, as in claim 1, wherein a side face portion is disposed at least one side of the front panel portion, said side face portion being adapted to securement purposes whereby said bracket may be mounted from one side thereof.

5. A tool holder, as in claim 1, wherein a base portion extends forward of the front panel portion at an obtuse angle thereto, said base portion being horizontal when the side face of the bracket is secured to a support means, said base portion further being adapted to serve as the support means element for a tool cleaning unit, and wherein two tool holder cubbies are present in the front panel portion, one on each side of the solder dump.

* * * * *